United States Patent
Porat et al.

(10) Patent No.: US 11,822,591 B2
(45) Date of Patent: Nov. 21, 2023

(54) QUERY-BASED GRANULARITY SELECTION FOR PARTITIONING RECORDINGS

(71) Applicant: International Business Machines Corporation, Armonk, NY (US)

(72) Inventors: Dror Porat, Haifa (IL); Daniel N. Rotman, Karmiel (IL); Gal Ashour, Yoqneam (IL)

(73) Assignee: International Business Machines Corporation, Armonk, NY (US)

( * ) Notice: Subject to any disclaimer, the term of this patent is extended or adjusted under 35 U.S.C. 154(b) by 999 days.

(21) Appl. No.: 15/696,535

(22) Filed: Sep. 6, 2017

(65) Prior Publication Data

US 2019/0073360 A1 Mar. 7, 2019

(51) Int. Cl.
| | |
|---|---|
| G06F 16/40 | (2019.01) |
| G06F 16/41 | (2019.01) |
| G06F 16/48 | (2019.01) |
| G06F 16/432 | (2019.01) |
| G06F 16/438 | (2019.01) |
| G06F 16/2457 | (2019.01) |
| G06F 16/783 | (2019.01) |

(52) U.S. Cl.
CPC ........ *G06F 16/41* (2019.01); *G06F 16/24578* (2019.01); *G06F 16/433* (2019.01); *G06F 16/438* (2019.01); *G06F 16/48* (2019.01); *G06F 16/7834* (2019.01); *G06F 16/7837* (2019.01); *G06F 16/7844* (2019.01)

(58) Field of Classification Search
USPC ....................................................... 707/730
See application file for complete search history.

(56) References Cited

U.S. PATENT DOCUMENTS

| | | | | |
|---|---|---|---|---|
| 7,627,823 | B2* | 12/2009 | Takahashi | H04N 5/262 |
| | | | | 715/764 |
| 8,676,033 | B2 | 3/2014 | Han et al. | |
| 8,862,252 | B2* | 10/2014 | Rottler | G11B 27/105 |
| | | | | 700/91 |
| 8,990,235 | B2* | 3/2015 | King | G06F 16/332 |
| | | | | 707/759 |
| 9,418,105 | B2* | 8/2016 | Buchheit | G06F 16/245 |
| 9,633,696 | B1* | 4/2017 | Miller | G11B 27/031 |
| 9,875,301 | B2* | 1/2018 | Hua | G06N 20/00 |

(Continued)

OTHER PUBLICATIONS

Aved et al., "Context Understanding from Query-Based Streaming Video," http://link.springer.com/chapter/10.1007/978-3-319-28971-7_19, May 26, 2016, pp. 1-7.

(Continued)

*Primary Examiner* — Belix M Ortiz Ditren
(74) *Attorney, Agent, or Firm* — Stephen R. Yoder

(57) ABSTRACT

A processor may receive a query from a user. The processor may identify one or more subjects in the query. The one or more subjects may include a particular subject. The processor may identify one or more sections of a recording. The processor may group the one or more sections into one or more subdivisions. The processor may determine that the particular subject is in at least one of the one or more sections. The processor may display the one or more subdivisions of the one or more sections that include the particular subject to the user.

17 Claims, 8 Drawing Sheets

(56) References Cited

U.S. PATENT DOCUMENTS

| | | | |
|---|---|---|---|
| 10,068,573 B1* | 9/2018 | Aykac | G06F 3/165 |
| 10,467,289 B2* | 11/2019 | Ambwani | G06F 16/7844 |
| 11,023,523 B2* | 6/2021 | Hauptmann | G06F 16/738 |
| 2009/0083790 A1 | 3/2009 | Wang et al. | |
| 2009/0254643 A1* | 10/2009 | Terheggen | G06F 16/438 |
| | | | 709/223 |
| 2011/0099195 A1 | 4/2011 | Patwardhan et al. | |
| 2011/0283309 A1* | 11/2011 | Bliss | G06F 40/166 |
| | | | 725/25 |
| 2012/0197905 A1* | 8/2012 | Kumar | G06F 16/24578 |
| | | | 707/E17.014 |
| 2012/0239663 A1* | 9/2012 | Tzruya | G06F 16/9535 |
| | | | 707/741 |
| 2012/0290950 A1* | 11/2012 | Rapaport | H04L 67/306 |
| | | | 715/753 |
| 2013/0021346 A1* | 1/2013 | Terman | G09B 5/08 |
| | | | 345/467 |
| 2014/0052696 A1* | 2/2014 | Soroushian | H04N 21/482 |
| | | | 707/736 |
| 2014/0164507 A1* | 6/2014 | Tesch | H04L 51/10 |
| | | | 709/204 |
| 2015/0082349 A1 | 3/2015 | Ishtiaq et al. | |
| 2015/0213118 A1* | 7/2015 | Sun | G06F 16/951 |
| | | | 707/736 |
| 2015/0254231 A1* | 9/2015 | Sawhney | G06F 16/9535 |
| | | | 704/9 |
| 2015/0293996 A1 | 10/2015 | Liu | |
| 2016/0070962 A1* | 3/2016 | Shetty | G06F 16/7834 |
| | | | 382/225 |
| 2016/0092959 A1* | 3/2016 | Gross | G06Q 30/0276 |
| | | | 705/26.62 |
| 2016/0226811 A1* | 8/2016 | Kerschhofer | G06Q 10/10 |
| 2017/0072321 A1* | 3/2017 | Thompson | H04N 21/2358 |
| 2018/0144059 A1* | 5/2018 | Saikia | G06F 16/9577 |
| 2018/0213339 A1* | 7/2018 | Shah | H04R 25/30 |
| 2018/0322103 A1* | 11/2018 | Yeo | G06F 40/279 |
| 2020/0183971 A1* | 6/2020 | Klein | G06F 16/683 |

OTHER PUBLICATIONS

Fegade et al., "A Survey on Content Based Video Retrieval," International Journal of Engineering and Computer Science ISSN: 2319-7242, vol. 3, Issue 7, Jul. 2014, http://www.ijecs.in/issue/v3-i7/79%20ijecs.pdf, pp. 7271-7279.

Kankanhalli, A. "Automatic Partitioning of Full-Motion Video," https://www.researchgate.net/publication/220461169_Automatic_Partitioning_of_Full-Motion_Video, page content uploaded Mar. 20, 2017, pp. 1-20.

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

QUERY-BASED GRANULARITY SELECTION FOR PARTITIONING RECORDINGS

BACKGROUND

The present disclosure relates generally to the field of image and acoustical analysis, and more specifically to analyzing a recording for specific instances of a queried subject.

A recording is typically composed of multiple audio and visual clips, which are then grouped together as scenes. The scenes are usually bookmarked and placed in a specific area of a recording based on the input and determination of a directive entity.

SUMMARY

Embodiments of the present disclosure include a method, computer program product, and system for displaying particular sections of a recording to a user with enough context to understand the particular sections. A processor may receive a query from a user. The processor may identify one or more subjects in the query. The one or more subjects may include a particular subject. The processor may identify one or more sections of a recording. The processor may group the one or more sections into one or more subdivisions. The processor may determine that the particular subject is in at least one of the one or more sections. The processor may display the one or more subdivisions of the one or more sections that include the particular subject to the user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
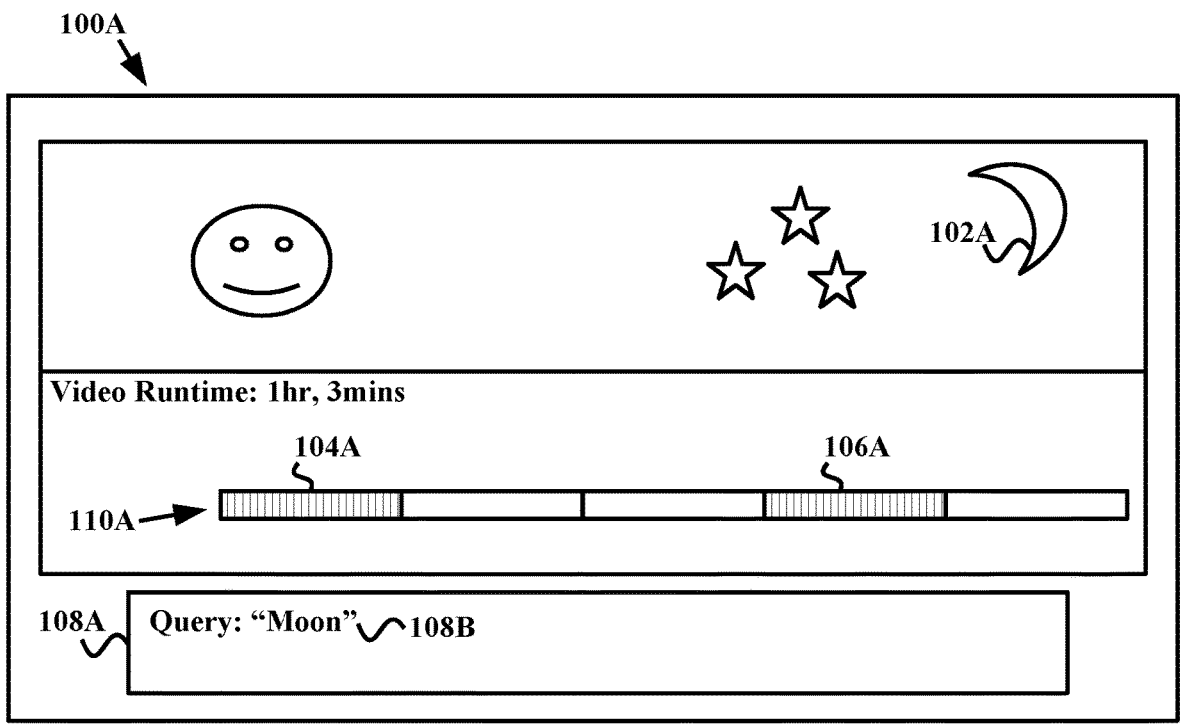
FIG. 1A illustrates an example recording window with a query box, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate to the field of image and acoustical analysis, and more specifically to searching a recording for specific instances of a queried subject. While the present disclosure is not necessarily limited to such applications, various aspects of the disclosure may be appreciated through a discussion of various examples using this context.

While watching and/or listening to a recording (e.g., a video, a .GIF, a song, etc.), a user may desire to identify specific portions within the recording that reference (e.g., show, vocalize, etc.) a particular subject (e.g., an actor/ actress, a word, etc.). The user may additionally desire to be given contextual information relating to the particular subject at the identified portions. That is, the user may desire to be given the specific portions within the recording that reference the particular subject while being given enough context surrounding the particular subject in the specific portions to understand what is occurring during the specific portions.

For example, a user may be watching a "happy movie," and the user may query "happiest moment." The processor may identify the moment that a character is laughing for 1 minute straight during the "happy movie." The processor may highlight the 1 minute portion of the laughing character in a runtime bar in a movie player window. The processor may additionally highlight the 30 seconds before the 1 minute portion in which the character is depicted as being told a funny joke. The user may now know the "happiest moment" in the movie is when the character is laughing and the context of why the character is laughing (e.g., the joke).

In some embodiments, a processor may receive a query from a user. The processor may identify one or more subjects in the query. In some embodiments, the one or more subjects may include a particular subject. The processor may identify one or more sections of a recording. The processor may group the one or more sections into one or more subdivisions. The processor may determine that the particular subject is in at least one of the one or more sections. The processor may display the one or more subdivisions of the one or more sections that include the particular subject to the user.

For example, a user may be watching a training video on a computer. The user may be a welder who only wants to understand how to inert-gas weld. The user may query "inert-gas welding" into a query box located within the training video window. Upon being queried, the computer may scan the entire training video, identifying all 100,000 frames of the training video (e.g., each frame being a section). The computer may continue to group the 100,000 individual frames together into 100 scenes (e.g., each scene being a subdivision); there being 1,000 frames to each scene (e.g., frames 90,000-99,999 in scene 90, etc.). The computer may determine that "inert-gas welding" is identified in frames 3,000-10,000 that are grouped in scenes 3 through 10 and frames 90,000-95,000 that are grouped in scene 90. The computer may display scenes 3 through 10, and 90 to the user for the user to focus on "inert-gas welding." In some embodiments, the computer may automatically play scenes 3 through 10, and 90 to the user (e.g., sequentially playing scenes 3 through 10 and then scene 90). In some embodiments, the computer may automatically combine scenes 3 through 10, and 90, generating a condensed video of scenes 3 through 10, and 90. The computer may display the condensed video on a new, pop-up window to the user.

In some embodiments, when grouping the one or more sections into the one or more subdivisions, the processor may determine that the at least one of the one or more sections of the recordings include at least one common feature. For example, a children's song may include a refrain that includes 4 words relating to "sunshine" and a bridge that includes 3 words relating to "rain". The processor may identify the entire song as having 50 total words (e.g., one or more sections). The processor may determine that the 4 words have a common relationship to "sunshine" and that the 3 words have a common relationship to "rain." The processor may group (e.g., into the subdivisions) the 4 words together and the 3 words together based on their common features.

In some embodiments, when determining that the at least one of the one or more sections of the recording include at least one common feature, the processor may analyze, using natural language processing, the one or more sections. The processor may identify a similar acoustic within at least one of the one or more sections. In some embodiments, the similar acoustic may be a sound identified to be above an identical acoustic threshold.

For example, a 3-minute music clip may mash 2 songs; each song being split and played at various times throughout the music clip. The processor, may identify the first song at the beginning of the music clip and note a first tempo. The processor may then identify the second song at 14 seconds into music clip and note a second tempo. The processor may then identify the same first tempo at 46 seconds into the music clip, the processor may determine that the first song is being played at the beginning of the music clip and at 46 seconds into the music clip by identifying that the tempo is the same (e.g., the tempo is within a threshold similar enough to be the first song). The processor may continue to analyze the music clip and identify where each song is in the music clip by matching the tempo.

In some embodiments, the processor may determine that the at least one of the one or more sections of the recording include at least one common feature by identifying a similar image within at least one of the one or more sections. In some embodiments, the similar image may be an image identified to be above an identical image threshold.

In some embodiments, the processor may generate one or more partitions of the one or more subdivisions. In some embodiments, the one or more partitions may be generated by the processor identifying a total number of the one or more sections. The processor may correlate the total number of the one or more sections to a first partition. In some embodiments, the first partition may include all of the one or more sections and be associated with a first granularity (e.g., scale). The processor may then correlate each subsequent partition to one minus the previous number of the one or more sections and associate each subsequent partition with a corresponding granularity. That is, the processor may group the sections into subdivisions with multiple levels of granularity (e.g., scales).

For example, a laptop playing a video may group multiple frames (e.g., sections) into 6 different scenes (e.g., subdivisions), the laptop differentiating the 6 scenes by partitions. Each scene may be made up from the same number of sections and have the same amount of time. In some embodiments, the number of sections and/or amount of time for each scene may differ from one or more other scenes. For example, the processor may group the sections into scenes according to a portion in the section (e.g., outside, in a shop, etc.), the person(s) in the sections, the topic of the section, or any other way.

In some embodiments, the laptop additionally, in a separate window, may generate a graph, the graph having the x-axis as time and the y-axis as partitions (e.g., the amount of frames per scene, or granularity). The laptop may make the bottom/first row of the graph the 6 scenes laid in sequential order (e.g., all 6 scenes lined in the order in which they appear in the video). The laptop may make a second row above the first row in which the laptop has removed one partitioning, leaving 5 scenes, each with more frames than before with 6 scenes. The laptop may continue to remove partitions and change the number of scenes until there is only one scene (e.g., the entire video) left.

In other words, as the level of granularity (and, therefore, number of scenes) changes, the grouping of the sections may change. In some embodiments, all of the sections in one of the scenes may be split up and added to one or more of the other scenes (e.g., a first portion of a removed scene may be added to the scene immediately prior to the removed scene, and a second portion may be added to the scene immediately following the removed scene). In other embodiments, each level of granularity may be considered independently. In other words, all of the sections may be reconsidered with little (or no) consideration for their grouping in a different level of granularity.

The laptop may generate the graph for the laptop to determine which level of granularity is needed in order for a user to have the full context of their query understood. The graph can then be provided to the user, and he may select a level of granularity. In some embodiments, the graph may not be generated in a separate window presentable to a user, but may be a background process that is not presentable to a user. In these embodiments, the graph may not be generated whatsoever; instead, the computer may group the sections and store the different levels of granularity in some other fashion.

In some embodiments, when determining that the particular subject is in at least one of the one or more sections, the processor may analyze each of the one or more sections. The processor may identify the particular subject in each of the one or more sections that the particular subject appears. The processor may then tag each of the one or more sections in which the particular subject is identified with an indicator.

For example, a user may be watching a video about dog training and desire to identify the portion of the video relating to heeling. The user may query "heeling," and a processor on the device playing the video may analyze the images and audio comprising the video using natural language processing and image processing (as discussed further in reference to FIGS. 4 and 5). The processor may identify 15 audio instances of the use of the word heeling or its derivatives (e.g., the dog heels, say heel, etc.) and 4 visual instances of a dog performing the action of heeling. The processor may tag each of the audio and visual instances of heeling with an indicator. The indicator may be used by the processor to quickly group the instances together on multiple granularity levels and determine which granularity level to display the instances to the user.

In some embodiments, when identifying the particular subject in each of the one or more sections, the processor may access a subject repository. In some embodiments, the subject repository may include each image and/or textual representation of dialogue of the one or more sections. The processor may examine the subject repository for one or more images and textual representations of dialogue associated with the particular subject. Following the example above, the video may have a closed-caption option, in which, the audio instances of the video may be additionally stored as text files (e.g., either as a part of the video or in a cloud-based file). The processor may access the text files and analyze the text files for the instances of the word heel or any of its derivatives. In some embodiments, the processor may use natural language processing to perform an image analysis and an acoustic analysis to identify the particular subject in each of the one or more subjects.

In some examples, when displaying the one or more subdivisions of the one or more sections that include the particular subject to the user, the processor may determine which of the one or more subdivisions to display to the user. In some embodiments, the processor may determine which of the one or more subdivisions to display to the user based on a selected granularity of the partitions. The processor may emphasize one or more specific areas of the recording associated with the determined subdivision to display to the user. For example, the processor, using natural language processing techniques to analyze tone may determine that scene 10 (e.g., determined from a granularity of partitions) and 5-seconds before and after scene 10 are sufficient to display enough context about the particular subject associated with a query to a user. The processor may highlight the area of scene 10 and 5-seconds before and after scene 10 to emphasize the area associated with the user's query.

In some embodiments, the contextual areas surrounding the particular subject may be emphasized in a different manner than the particular area. Following the example above, scene 10 (e.g., which includes the particular subject) may be highlighted green and the 5-seconds before and after scene 10 (e.g., the contextual areas) may be highlighted yellow.

In some embodiments, when determining which of the one or more subdivisions to display to the user, the processor may analyze the one or more sections of the one or more subdivisions. In some embodiments, the processor may analyze the one or more sections of the one or more subdivisions for the number of instances of a particular subject. The processor may determine that the total number of the one or more sections for the one or more subdivisions satisfy a predetermined threshold (e.g., that the particular subject is shown above the threshold). The processor may then exclude each of the one or more subdivisions that are above the predetermined threshold.

In some embodiments, when determining which of the one or more subdivisions to display to the user, the processor may analyze the one or more sections of the one or more subdivisions. The processor may determine that the total number of the one or more sections for the one or more subdivisions are below a predetermined threshold. The processor may then exclude each of the one or more subdivisions that are below the predetermined threshold.

For example, a song may include 30 words and a processor may group 10 sequential words together generate 3 verses. The processor may receive a query for "friendship part," the processor may then analyze, using natural language processing, the 3 verses for any instances of "friendship," friendship's derivatives, synonyms, or associates (e.g., companion, buddy, pal, etc.). The processor may determine that the first verse contains 1 word regarding friendship, the second verse contains 5 words regarding friendship, and the third verse contains no words regarding friendship. The processor may be preprogrammed to display query results if a particular subject associated with the query is found more than 3 times in a particular verse. The processor may then determine to exclude the first verse and the third verse from being displayed to a user because the 3-word threshold was not met.

In some embodiments, the identifying of the one or more subjects in the query comprises natural language processing. In some embodiments, the processor may automatically identify all of the subdivisions with at least one subject. The processor may score the subdivisions according to the number of times the subject is identified in a subdivision. The processor may compare each score to a subject identification threshold. The processor may generate a new recording of the subdivisions that have a score exceeding the subject identification threshold.

For example, using natural language processing (e.g., image analysis and acoustic analysis), a processor may identify all scenes of a movie where the name "Sally" is used and where the actress playing "Sally" is on screen. The movie may have 25 scenes and the processor may identify that the name "Sally" and the actress playing "Sally" appear 4 times in the third scene, 7 times in the fifth scene, and 20 times in the twenty-second scene. Each number of times may equate to a score and the processor may compare the number of times "Sally" was identified in each scene in which she was identified to a threshold. The threshold may be 5 times. That is, "Sally" must have appeared in a scene 5 or more times to be considered a relevant scene. The processor may then identify that fifth and twenty-second scenes exceed the threshold and generate a new video only containing the fifth and twenty-second scenes.

Referring now to FIG. 1A, illustrated is an example recording window 100A, in accordance with embodiments of the present disclosure. In some embodiments, the recording window 100A may include one or more animations of a video, such as a moon 102A. Additionally, the recording window 100A may include a runtime bar 110A, which may indicate the runtime length of the video. In some embodiments, the recording window 100A may include a query box 108A.

In some embodiments, a user, using a computer, may begin playing a video in the recording window 100A. The recording window 100A may indicate to the user, using the runtime bar 110A, that the movie is approximately 1 hour and 3 minutes in length. In some embodiments, the runtime bar 110A may be split into one or more scenes (e.g., subdivisions) that indicate where and at what time video is presently at.

In some embodiments, the user may query a particular subject 108B in the query box 108A. In this example, the user may query the particular subject 108B, "moon," and desire to only view or identify areas in the video which have a picture of or mention the moon. The computer may analyze the video for any instances of the moon 102A appearing or being referenced in the video. In some embodiments, the computer may identify that a first scene 104A and a fourth scene 106A of the video include the moon 102A or reference the moon 102A. The computer system may continue to highlight, or by any other means emphasize, the first scene 104A and the fourth scene 106A.

The user may now quickly identify the areas of the video that include or reference the moon 102A and transition to the desired scene without having to find the moon 102A by trial-and-error or having to view the entire video.

Figure 1B:
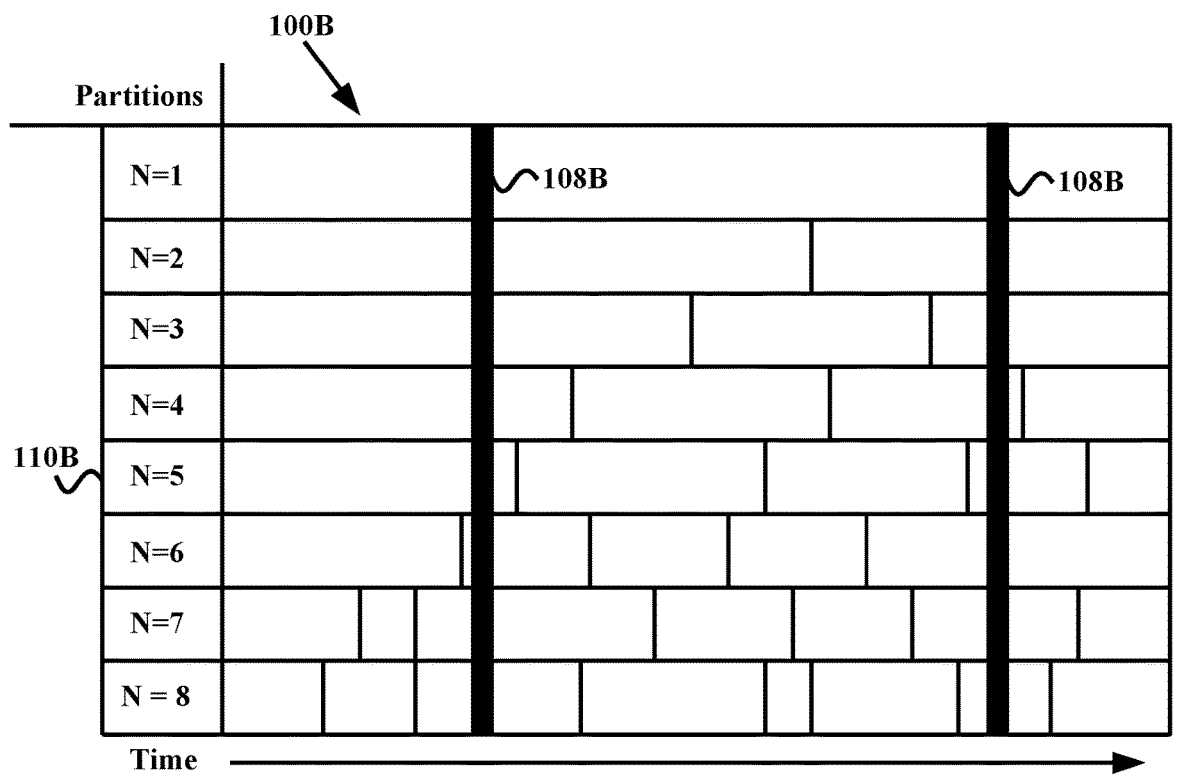
FIG. 1B illustrates an example granularity selection window, in accordance with embodiments of the present disclosure.

Referring now to FIG. 1B, illustrated is an example granularity selection window 100B, in accordance with embodiments of the present disclosure. In some embodiments, the granularity selection window 100B may be a separate window generated by the computer discussed in reference to FIG. 1A, and may be visible to a user. In some embodiments, the granularity selection window 100B may be a background operation that is generated by the computer and not observable (e.g., visible) by the user. In some embodiments, the granularity window 100B may not be generated at all.

In some embodiments, the granularity selection window 100B may correlate to the recording window 100A, which is discussed above in FIG. 1A. In some embodiments, the granularity selection window 100B may be generated by the computer after the user has queried "moon" in the query box 108A. The computer system may use the granularity selection window 100B to determine the number of scenes to partition (e.g., divide, subdivision, etc.) the video into (e.g., the granularity of the video).

In some embodiments, the granularity selection window 100B may include an x-axis associated with the time (e.g., runtime, length, etc.) of the video and a y-axis associated with the partitions (e.g., the granularity) of the video. In some embodiments, each row of the granularity selection window 100B may depict a granularity of partitioning (e.g., subdivisions of a recording). In some embodiments, the computer may make the first granularity level of the granularity selection window 100B equal to the total number of frames (e.g., sections) of the video, in this case the granularity selection window 100B may begin with a granularity of 8 (e.g., denoted with 7 partition lines and 8 subdivision blocks in the N=8 row of FIG. 1B). That is, in some embodiments, N in the granularity selection window 100B may be the number of subdivisions starting with the granularity of N=8.

In some embodiments, after establishing a first level of granularity, the computer may continue to generate the entirety of the granularity selection window 100B by subsequently subtracting one partition line (e.g., level of granularity) until there is only one scene associated with the video (e.g., the entire video). In some embodiments, the computer may take the query from query box 108A and associate the particular subject 108B to the granularity selection window 100B (e.g., particular subject 108B may show where in the video the particular subject that was queried is found). The computer may associate every instance of the particular subject 108B found in the video on the granularity selection window 100B.

In some embodiments, the computer may analyze the granularity selection window 100B and determine which level of granularity provides the most appropriate level of context to display the particular subject 108B to the user. That is, the computer may determine which level of granularity provides enough context to not over-segment (e.g., provide a subdivision that is time-wise too short to provide enough context of the particular subject) or under-segment (e.g., provide a subdivision that is time-wise too large to provide more than enough context of the particular subject) the particular subject 108B.

In this example in FIG. 1B, the computer may determine that a fifth level of granularity 110B (e.g., N=5) is the most appropriate level of granularity to divide the video into. In some embodiments, the computer may determine to use the fifth level of granularity 110B because the particular subject 108B (e.g., the word "moon") may most appropriately be described in context during the first scene 104A and the fourth scene 106A, which may be the only scenes that depict the moon and may provide an appropriate amount of time to not under or over-segment the particular subject 108B.

In some embodiments, the computer may determine that the fifth level of granularity 110B is the most appropriate level of granularity by incorporating natural language processing techniques that identify that the particular subject 108B (e.g., the word "moon") is best described in context when the video is split into 5 subdivisions (e.g., scenes).

The computer may determine that the first subdivision of the fifth level of granularity 110B is the smallest portion over the particular subject 108B (e.g., in comparison to the other levels of granularity, where N=8 through 6 not having a first subdivision over the particular subject 108B and N=4 through 1 not having a first subdivision as close as the fifth level of granularity 110B). In some embodiments, the fifth level of granularity 110B may correlate to the runtime bar 110A, which is partitioned into five subdivisions.

Figure 2:
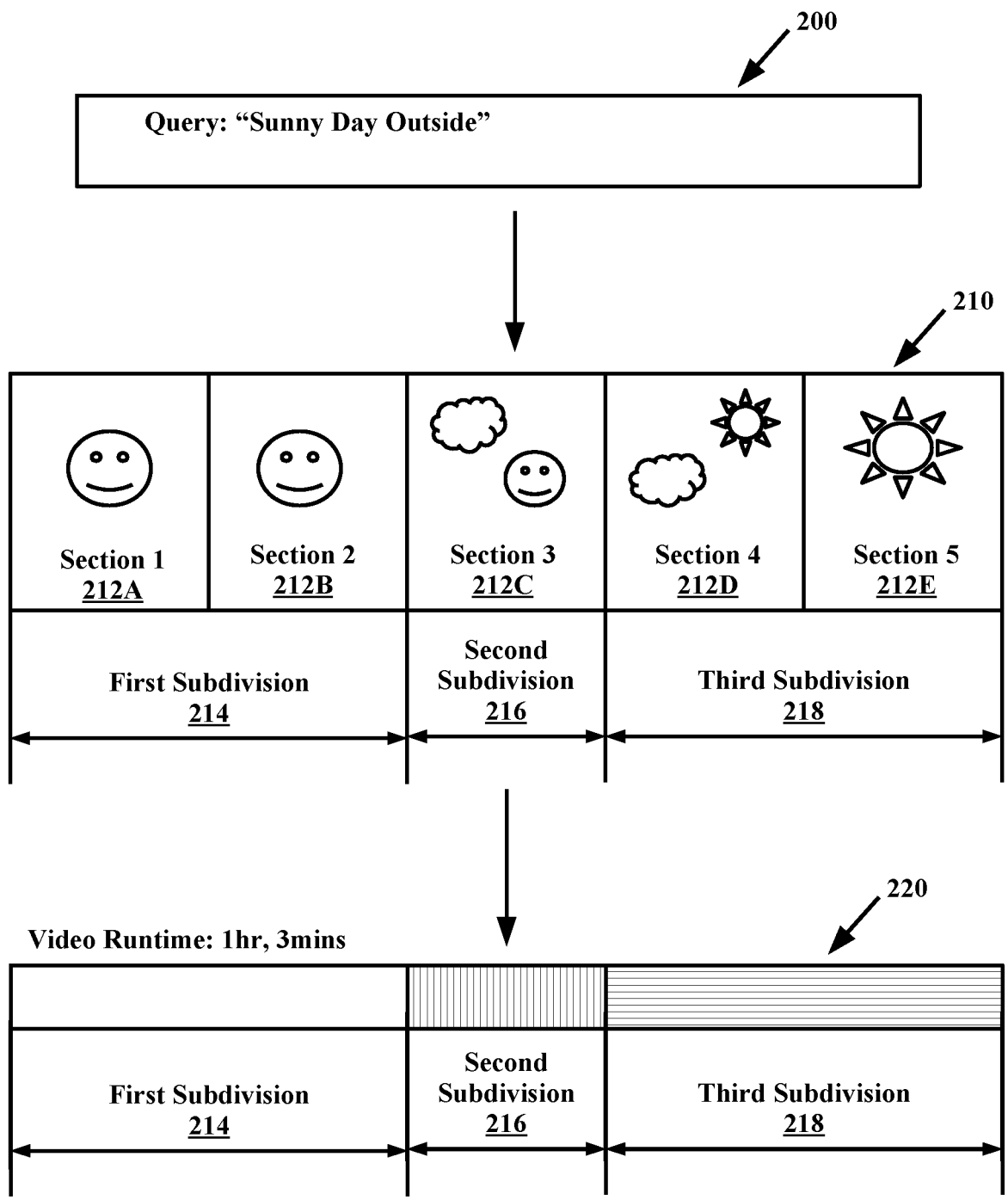
FIG. 2 illustrates a visual representation of grouping sections of a recording into subdivisions upon receiving a query, in accordance with embodiments of the present disclosure.

Referring now to FIG. 2, illustrated is a visual representation of grouping sections of a recording 210 into subdivisions upon receiving a query 200, in accordance with embodiments of the present disclosure. In some embodiments, a processor may receive the query 200. In the instance of this example, the query 200 may include the particular object "Sunny Day Outside."

In some embodiments, the processor may analyze the recording 210, which may be associated with the query 200. In some embodiments, the video may be the same video as discussed above in reference to FIGS. 1A and 1B. In some embodiments, the recording 210 may include a first section 212A, a second section 212B, a third section 212C, a fourth section 212D, and a fifth section 212E. In some embodiments, the processor may analyze the recording 210 and identify one or more common features in the first through fifth sections 212A-E.

The processor may identify the first section 212A and the second section 212B as having the same common feature of a man. In some embodiments, the processor may determine to group the first section 212A and the second section 212B as the first subdivision 214, based on the common feature. In some embodiments, the processor may continue to group the third section 212C as a single section in a second subdivision 216. The processor may additionally identify the common feature of a sun in the fourth section 212D and the fifth section 212E. In some embodiments, the processor may group the fourth section 212D and the fifth section 212E as a third subdivision 218 based on the sun. In some embodiments, the processor may group the third section 212C and the fourth section 212D into a subdivision based on the cloud. In some embodiments, the processor may determine not to group the third section 212C and the fourth section 212D into a subdivision because the processor may determine from the query 200 that it is more appropriate to group the fourth section 212D on the basis of an image displaying a subject more associated with the query 200 (e.g., the image of the sun based on the word "sunny") as compared to a cloud (e.g., which may infer "outside," but is not a strong inference of "sunny").

In some embodiments, the processor may determine how to group the sections based on the granularity selection window, as discussed previously in FIG. 1B. In some embodiments, the processor may determine that grouping the fourth section 212D and the fifth section 212E together based on the query 200, which defines "sunny day outside" as a particular subject and the common feature of the sun may be better granularity grouping than had the third section 212C and the fourth section 212D been grouped together based on the common feature of a cloud.

In some embodiments, the processor may associate the granularity selection (e.g., the three subdivisions 214-218) with the runtime bar 220, which may be the same runtime bar 110A that was discussed previously in FIG. 1A. In some embodiments, the processor may partition the runtime bar 220 into the three subdivisions 214-218. In some embodiments, the processor may emphasize which subdivisions are correlated most strongly to the query 200.

Following the example depicted in FIG. 2, the run time bar may not be highlighted in the first subdivision 214 because no indication of the sun or any other weather related inference may be identified in the first subdivision 214. Next, the second subdivision may be highlighted red, indicating that the second subdivision may not necessarily depict an image or video associated with the query 200, however, it may be good contextual information to view, such as the weather is changing in from a cloudy day. Lastly, the third subdivision 218 may be highlighted green, indicating that the third subdivision 218 is the subdivision of the recording 210 that is most relatable to the query 200, having two instances most associated with of the particular subject (e.g., a sunny day outside and the sun).

Figure 3:
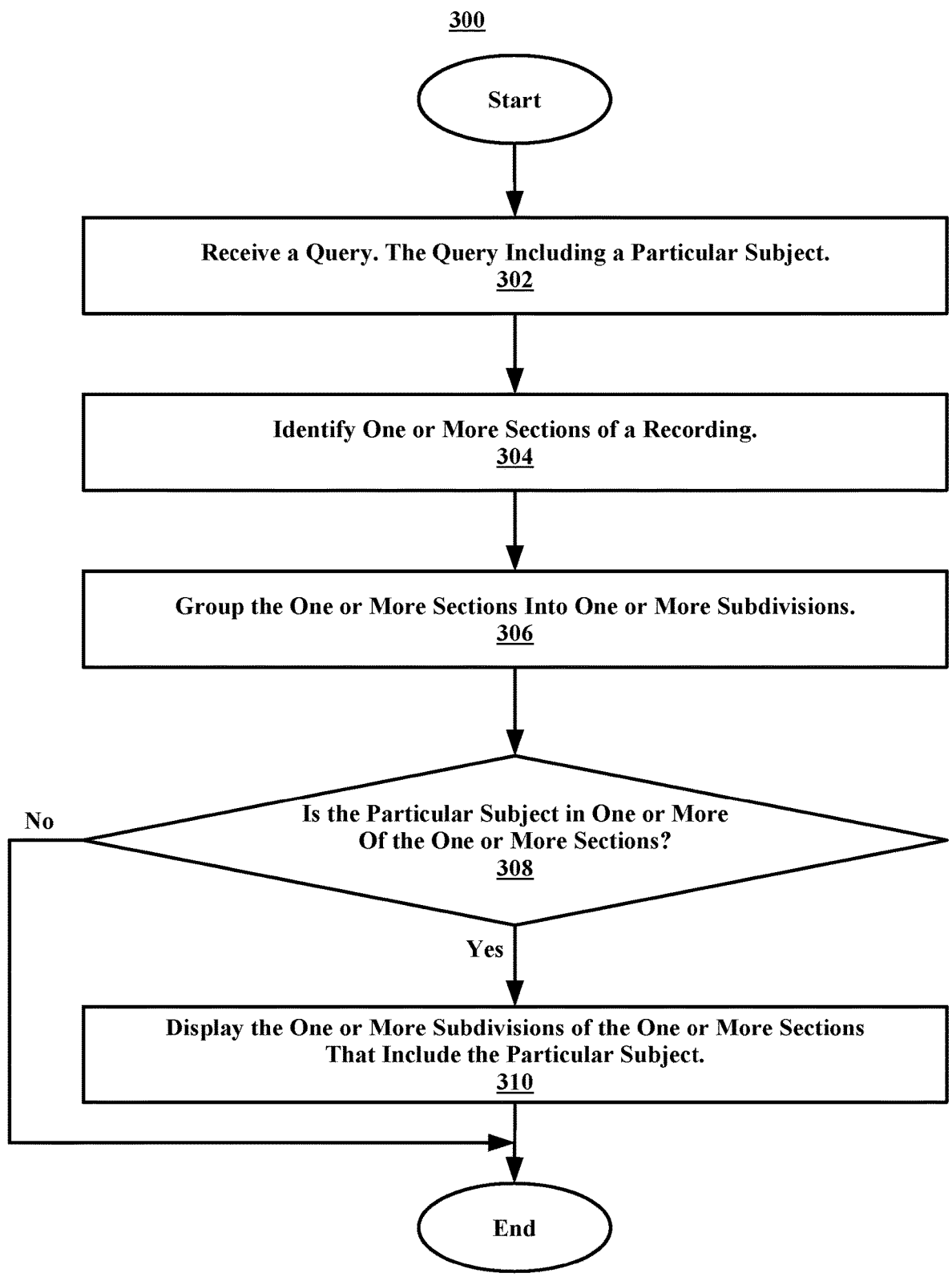
FIG. 3 illustrates a flowchart of an example method for displaying one or more subdivisions of a recording that include a particular subject, in accordance with embodiments of the present disclosure.

Referring now to FIG. 3, illustrated is a flowchart of an example method 300 for displaying one or more subdivisions of a recording that include a particular subject, in accordance with embodiments of the present disclosure. In some embodiments, the method 300 may be performed by a processor or any other variations of a computing device or devices.

In some embodiments, the method 300 may being at operation 302. At operation 302, the processor may receive a query. In some embodiments, the query may be from a user. In some embodiments, the query may include a particular subject. In some embodiments, the processor may determine that the query may include a particular subject by performing natural language processing and/or image analysis, as discussed below in reference to FIGS. 4 and 5. In some embodiments, after operation 302, the method 300 may proceed to operation 304.

At operation 304, the processor may identify one or more sections of a recording (e.g., video, .GIF, song, etc.). After operation 304, the method 300 may proceed to operation 306. At operation 306, the processor may group the one or more sections into one or more subdivisions.

After operation 306, the method 300 may proceed to decision block 308. At decision block 308, the processor may determine if the particular subject is in at least one of the one or more sections. If it is determined by the processor that the particular subject is not in at least one of the one or more sections, the method 300 may end. If it is determined by the processor that the particular subject is in at least one of the one or more sections, the method 300 may proceed to operation 310.

At operation 310, the processor may display the one or more subdivisions of the one or more sections that include the particular subject. In some embodiments, the displaying may be to a user. In some embodiments, the displaying may be by highlighting the one or more subdivision or emphasizing the one or more subdivisions in any manner (e.g., flagging, superimposing an icon, etc.). In some embodiments, the processor may automatically generate a new recording (e.g., video, song, etc.) that includes only the subdivisions with the particular subject and/or subjects related to the particular subject (e.g., synonyms/associations with the particular subject). After operation 310, the method 300 may end.

For example, a user may receive a 30-minute cartoon animation in an email on a computer. The user may desire to skip directly to the "funny portion" of the cartoon. The user may query "funny portion" on the computer and the computer may begin analyzing the cartoon. The computer may identify that there are 1000 frames that make-up the cartoon. The computer may identify common features in the 1000 frames and group sequential frames including the common features together. The computer may group the 1000 frames into 10 different scenes based on the common features found in each respective scene (and therefore sequential frames). The computer may then analyze each scene for the "funny portion," the computer may identify that in scenes 5 and 8 there is a laugh-track associated with the frames of those scenes. The processor may determine that the laugh-track indicates the "funny portion" and display scenes 5 and 8 to the user. The process may display the scenes to the user highlighting the portions of scenes 5 and 8 on a play-bar associated with the cartoon.

Figure 4:
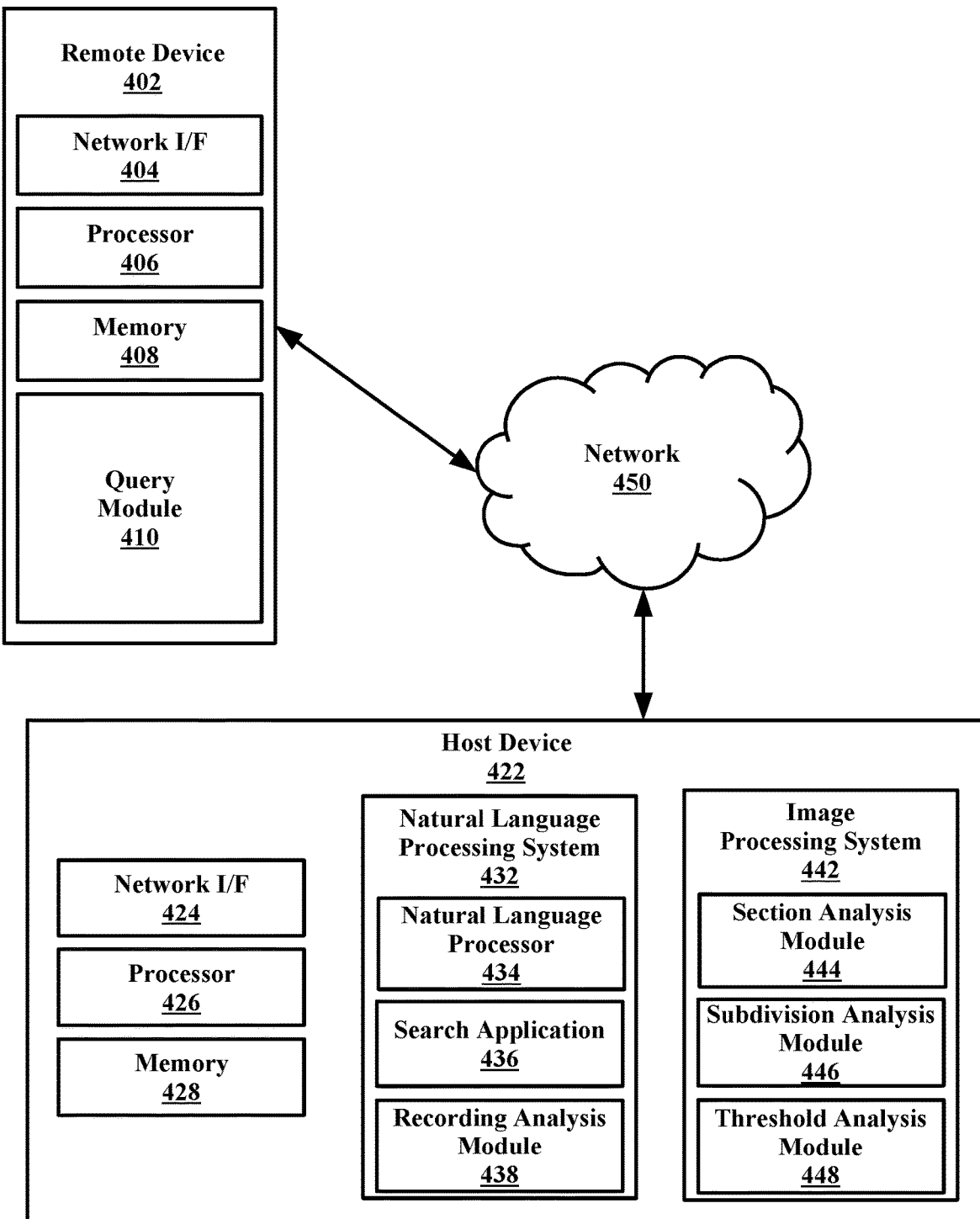
FIG. 4 illustrates a block diagram of an example computing environment in which illustrative embodiments of the present disclosure may be implemented.

As discussed above, aspects of the disclosure may relate to natural language processing. Accordingly, an understanding of the embodiments of the present invention may be aided by describing embodiments of natural language processing systems and the environments in which these systems may operate. Turning now to FIG. 4, illustrated is a block diagram of an example computing environment 400 in which illustrative embodiments of the present disclosure may be implemented. In some embodiments, the computing environment 400 may include a remote device 402 and a host device 422.

Consistent with various embodiments, the host device 422 and the remote device 402 may be computer systems. The remote devices 402 and the host device 422 may include one or more processors 406 and 426 and one or more memories 408 and 428, respectively. The remote device 402 and the host device 422 may be configured to communicate with each other through an internal or external network interface 404 and 424. The network interfaces 404 and 424 may be modems or network interface cards. The remote device 402 and/or the host device 422 may be equipped with a display or monitor. Additionally, the remote device 402 and/or the host device 422 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). In some embodiments, the remote device 402 and/or the host device 422 may be servers, desktops, laptops, or hand-held devices.

The remote device 402 the host device 422 may be distant from each other and communicate over a network 450. In some embodiments, the host device 422 may be a central hub from which remote device 402 can establish a communication connection, such as in a client-server networking model. Alternatively, the host device 12 and remote device 402 may be configured in any other suitable networking relationship (e.g., in a peer-to-peer configuration or using any other network topology).

In some embodiments, the network 450 can be implemented using any number of any suitable communications media. For example, the network 450 may be a wide area network (WAN), a local area network (LAN), an internet, or an intranet. In certain embodiments, the remote device 402 and the host device 422 may be local to each other, and communicate via any appropriate local communication medium. For example, the remote device 402 and the host device 422 may communicate using a local area network (LAN), one or more hardwire connections, a wireless link or router, or an intranet. In some embodiments, the remote device 402 and the host device 422 may be communicatively coupled using a combination of one or more networks and/or one or more local connections. For example, the remote device 402 may be hardwired to the host device 422 (e.g., connected with an Ethernet cable) or the remote device 402 may communicate with the host device using the network 450 (e.g., over the Internet).

In some embodiments, the network 450 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 450.

In some embodiments, the remote device 402 may enable a user to input (or may input automatically with or without a user) a query to the host device 422 in order to identify subdivisions of a recording that include a particular subject. For example, the remote device 402 may include a query module 410 and a user interface (UI). The query module 410 may be in the form of a web browser or any other suitable software module, and the UI may be any type of interface (e.g., command line prompts, menu screens, graphical user interfaces). The UI may allow a user to interact with the remote device 402 to input, using the query module 410, a query to the host device 422, which may receive the query.

In some embodiments, the host device 422 may include a natural language processing system 432. The natural language processing system 432 may include a natural language processor 434, a search application 436, and a recording module 438. The natural language processor 434 may include numerous subcomponents, such as a tokenizer, a part-of-speech (POS) tagger, a semantic relationship identifier, and a syntactic relationship identifier. An example natural language processor is discussed in more detail in reference to FIG. 5.

The search application 436 may be implemented using a conventional or other search engine, and may be distributed across multiple computer systems. The search application 436 may be configured to search one or more databases (e.g., repositories) or other computer systems for content that is related to a query submitted by the remote device 402. For example, the search application 436 may be configured to search medical dictionaries, papers, and/or archived medical reports to help identify a particular subject related to a query provided for a health class video. The recording analysis module 438 may be configured to analyze a recording to identify a particular subject (e.g., of the query). The recording analysis module 438 may include one or more modules or units, and may utilize the search application 436, to perform its functions (e.g., to identify a particular subject in a recording), as discussed in more detail in reference to FIG. 5.

In some embodiments, the host device 422 may include an image processing system 442. The image processing system 442 may be configured to analyze images associated with a recording to create an image analysis. The image processing system 442 may utilize one or more models, modules, or units to perform its functions (e.g., to analyze the images associated with the recording and generate an image analysis). For example, the image processing system 442 may include one or more image processing models that are configured to identify specific images related to a recording. The image processing models may include a section analysis module 444 to analyze single images associated with the recording and to identify the location of one or more features of the single images. As another example, the image processing system 442 may include a subdivision module 446 to group multiple images together identified to have a common feature of the one or more features. In some embodiments, the image processing models may be implemented as software modules. For example, the image processing system 442 may include a section analysis module and a subdivision analysis module. In some embodiments, a single software module may be configured to analyze the image(s) using the image processing models.

In some embodiments, the image processing system 442 may include a threshold analysis module 448. The threshold analysis module 448 may be configured to compare, the instances of a particular subject identified in a subdivision of sections of the recording against a threshold number of instances. The threshold analysis module 448 may then determine if the subdivision should be displayed to a user.

In some embodiments, the host device may have an optical character recognition (OCR) module. The OCR module may be configured to receive a recording sent from the remote device 402 and perform optical character recognition (or a related process) on the recording to convert it into machine-encoded text so that the natural language processing system 432 may perform NLP on the report. For example, the remote device 402 may transmit a video of a medical procedure to the host device 422. The OCR module may convert the video into machine-encoded text, and then the converted video may be sent to the natural language processing system 432 for analysis. In some embodiments, the OCR module may be a subcomponent of the natural language processing system 432. In other embodiments, the OCR module may be a standalone module within the host device 422. In still other embodiments, the OCR module may be located on the remote device 402 and may perform OCR on the recording before the recording is sent to the host device 422.

While FIG. 4 illustrates a computing environment 400 with a single host device 422 and a remote device 402, suitable computing environments for implementing embodiments of this disclosure may include any number of remote devices and host devices. The various models, modules, systems, and components illustrated in FIG. 4 may exist, if at all, across a plurality of host devices and remote devices. For example, some embodiments may include two host devices. The two host devices may be communicatively coupled using any suitable communications connection (e.g., using a WAN, a LAN, a wired connection, an intranet, or the Internet). The first host device may include a natural language processing system configured to receive and analyze a video, and the second host device may include an image processing system configured to receive and analyze .GIFS, to generate an image analysis.

It is noted that FIG. 4 is intended to depict the representative major components of an exemplary computing environment 400. In some embodiments, however, individual components may have greater or lesser complexity than as represented in FIG. 4, components other than or in addition to those shown in FIG. 4 may be present, and the number, type, and configuration of such components may vary.

Figure 5:
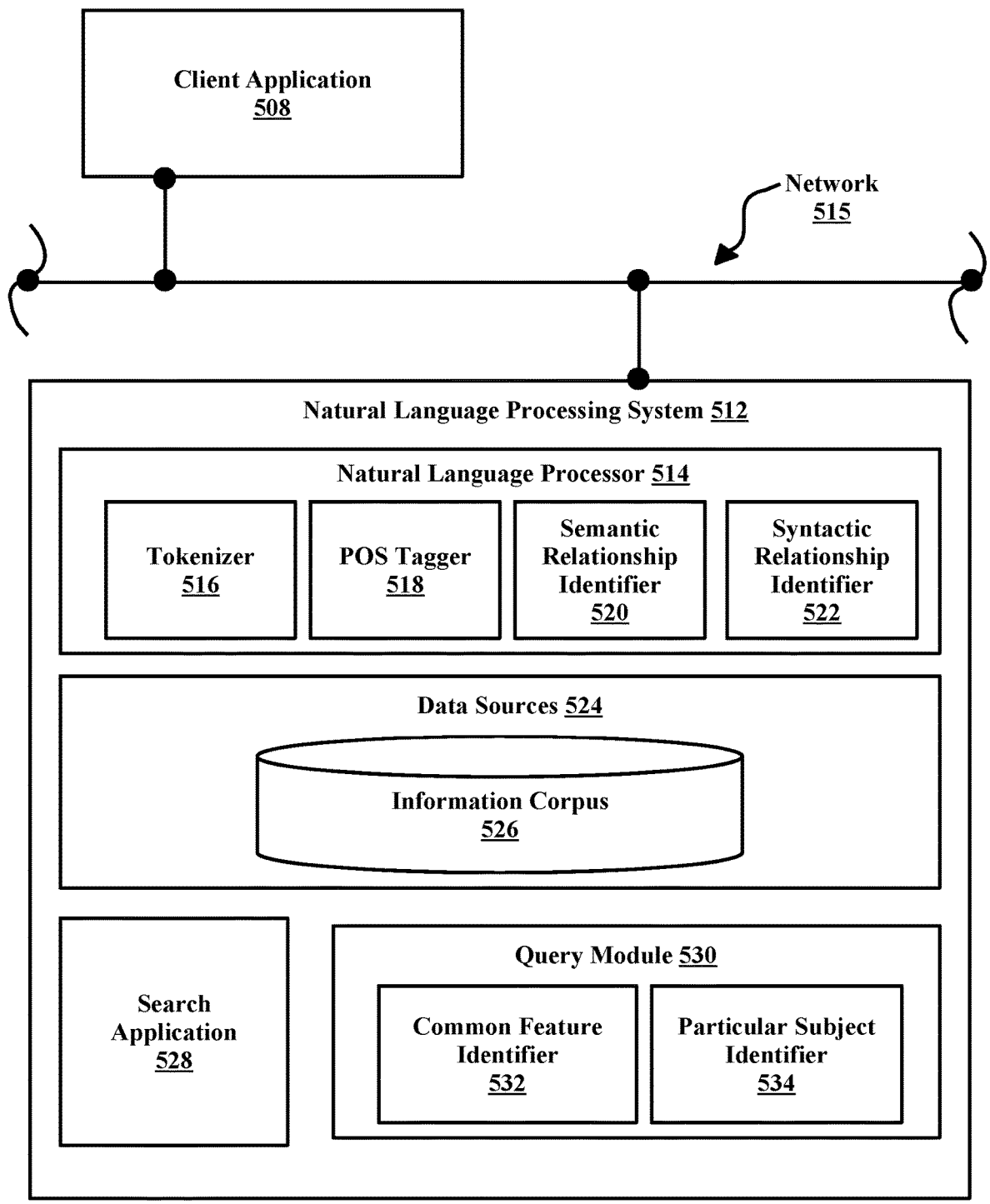
FIG. 5 illustrates a block diagram of an example natural language processing system configured to analyze a recording to identify a particular subject of a query, in accordance with embodiments of the present disclosure.

Referring now to FIG. 5, shown is a block diagram of an exemplary system architecture 500, including a natural language processing system 512, configured to analyze medical data to identify a condition and a criterion, in accordance with embodiments of the present disclosure. In some embodiments, a remote device (such as remote device 402 of FIG. 4) may submit a recording and/or a query to be analyzed to the natural language processing system 512 which may be housed on a host device (such as host device 422 of FIG. 4). Such a remote device may include a client application 508, which may itself involve one or more entities operable to generate or modify information associated with the recording and/or query that is then dispatched to a natural language processing system 512 via a network 515.

Consistent with various embodiments, the natural language processing system 512 may respond to query and recording submissions sent by a client application 508. Specifically, the natural language processing system 512 may analyze a received a recording and/or a query related to the recording to identify a particular subject in the recording. In some embodiments, the natural language processing system 512 may include a natural language processor 514, data sources 524, a search application 528, and a query module 530. The natural language processor 514 may be a computer module that analyzes the recording and the query. The natural language processor 514 may perform various methods and techniques for analyzing recordings and/or queries (e.g., syntactic analysis, semantic analysis, etc.). The natural language processor 514 may be configured to recognize and analyze any number of natural languages. In some embodiments, the natural language processor 514 may group one or more sections of a recording into one or more subdivisions. Further, the natural language processor 514 may include various modules to perform analyses of recordings. These modules may include, but are not limited to, a tokenizer 516, a part-of-speech (POS) tagger 518 (e.g., which may tag each of the one or more sections in which the particular subject is identified), a semantic relationship identifier 520, and a syntactic relationship identifier 522.

In some embodiments, the tokenizer 516 may be a computer module that performs lexical analysis. The tokenizer 516 may convert a sequence of characters (e.g., images, sounds, etc.) into a sequence of tokens. A token may be a string of characters included in a recording and categorized as a meaningful symbol. Further, in some embodiments, the tokenizer 516 may identify word boundaries in a recording and break any text within the recording (e.g., from closed-caption, etc.) into their component text elements, such as words, multiword tokens, numbers, and punctuation marks. In some embodiments, the tokenizer 516 may receive a string of characters, identify the lexemes in the string, and categorize them into tokens.

Consistent with various embodiments, the POS tagger 518 may be a computer module that marks up a word in a recording to correspond to a particular part of speech. The POS tagger 518 may read a passage or other text in natural language and assign a part of speech to each word or other token. The POS tagger 518 may determine the part of speech to which a word (or other spoken element) corresponds based on the definition of the word and the context of the word. The context of a word may be based on its relationship with adjacent and related words in a phrase, sentence, or paragraph. In some embodiments, the context of a word may be dependent on one or more previously analyzed recordings (e.g., the content of one recording may shed light on the meaning of one or more subjects in another recording). Examples of parts of speech that may be assigned to words include, but are not limited to, nouns, verbs, adjectives, adverbs, and the like. Examples of other part of speech categories that POS tagger 518 may assign include, but are not limited to, comparative or superlative adverbs, wh-adverbs, conjunctions, determiners, negative particles, possessive markers, prepositions, wh-pronouns, and the like. In some embodiments, the POS tagger 518 may tag or otherwise annotate tokens of a recording with part of speech categories. In some embodiments, the POS tagger 518 may tag tokens or words of a recording to be parsed by the natural language processing system 512.

In some embodiments, the semantic relationship identifier 520 may be a computer module that may be configured to identify semantic relationships of recognized subjects (e.g., words, phrases, images, etc.) in a recording. In some embodiments, the semantic relationship identifier 520 may determine functional dependencies between entities and other semantic relationships.

Consistent with various embodiments, the syntactic relationship identifier 522 may be a computer module that may be configured to identify syntactic relationships in a recording composed of tokens. The syntactic relationship identifier 522 may determine the grammatical structure of sentences such as, for example, which groups of words are associated as phrases and which word is the subject or object of a verb. The syntactic relationship identifier 522 may conform to formal grammar.

In some embodiments, the natural language processor 514 may be a computer module that may group sections of a recording into subdivisions and generate corresponding data structures for one or more subdivisions of the recording. For example, in response to receiving a recording at the natural language processing system 512, the natural language processor 514 may output subdivisions of the recording as data structures. In some embodiments, a subdivision may be represented in the form of a graph structure. To generate the subdivision, the natural language processor 514 may trigger computer modules 516-522.

In some embodiments, the output of natural language processor 514 may be used by search application 528 to perform a search of a set of (i.e., one or more) corpora to retrieve one or more subdivision including a particular subject associated with a query and send the output to an image processing system and to a comparator. As used herein, a corpus may refer to one or more data sources, such as the data sources 524 of FIG. 5. In some embodiments, the data sources 524 may include video libraries, data warehouses, information corpora, data models, and document repositories. In some embodiments, the data sources 524 may include an information corpus 526. The information corpus 526 may enable data storage and retrieval. In some embodiments, the information corpus 526 may be a subject repository that houses a standardized, consistent, clean, and integrated list of images and dialogue. For example, the information corpus 526 may include the famous movie quotes. The data may be sourced from various operational systems. Data stored in the information corpus 526 may be structured in a way to specifically address reporting and analytic requirements. In some embodiments, the information corpus 526 may be a relational database.

In some embodiments, the query module 530 may be a computer module that identifies common features within sections of a recording and a particular subject of a query in subdivisions of sections of the recording. In some embodiments, the query module 530 may include a common feature identifier 532 and a particular subject identifier 534. When a query is received by the natural language processing system 512, the query module 530 may be configured to analyze a recording using natural language processing to identify a particular subject. The query module 530 may first identity one or more subjects in the recording using the natural language processor 514 and related subcomponents 516-522. After identifying the one or more subjects, the common feature identifier 532 may identify one or more common features present in sections of the recording. In some embodiments, the common features in the sections may be the same subject that is identified. Once a common feature is identified, the common feature identifier 532 may be configured to transmit the sections that include the common feature to an image processing system (shown in FIG. 4) and/or to a comparator (shown in FIG. 4).

After identifying common features of a recording using the common feature identifier 532, the query module may group sections of the recording having common features into subdivisions. The particular subject identifier 534 may then identify a particular subject in subdivisions of the recording, based upon the query. In some embodiments, the particular subject may one or more of the common features identified in the one or more sections of the recording. After identifying a particular subject relating to the query, the particular subject identifier 534 may be configured to transmit the criterion to an image processing system (shown in FIG. 4) and/or to a comparator (shown in FIG. 4).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
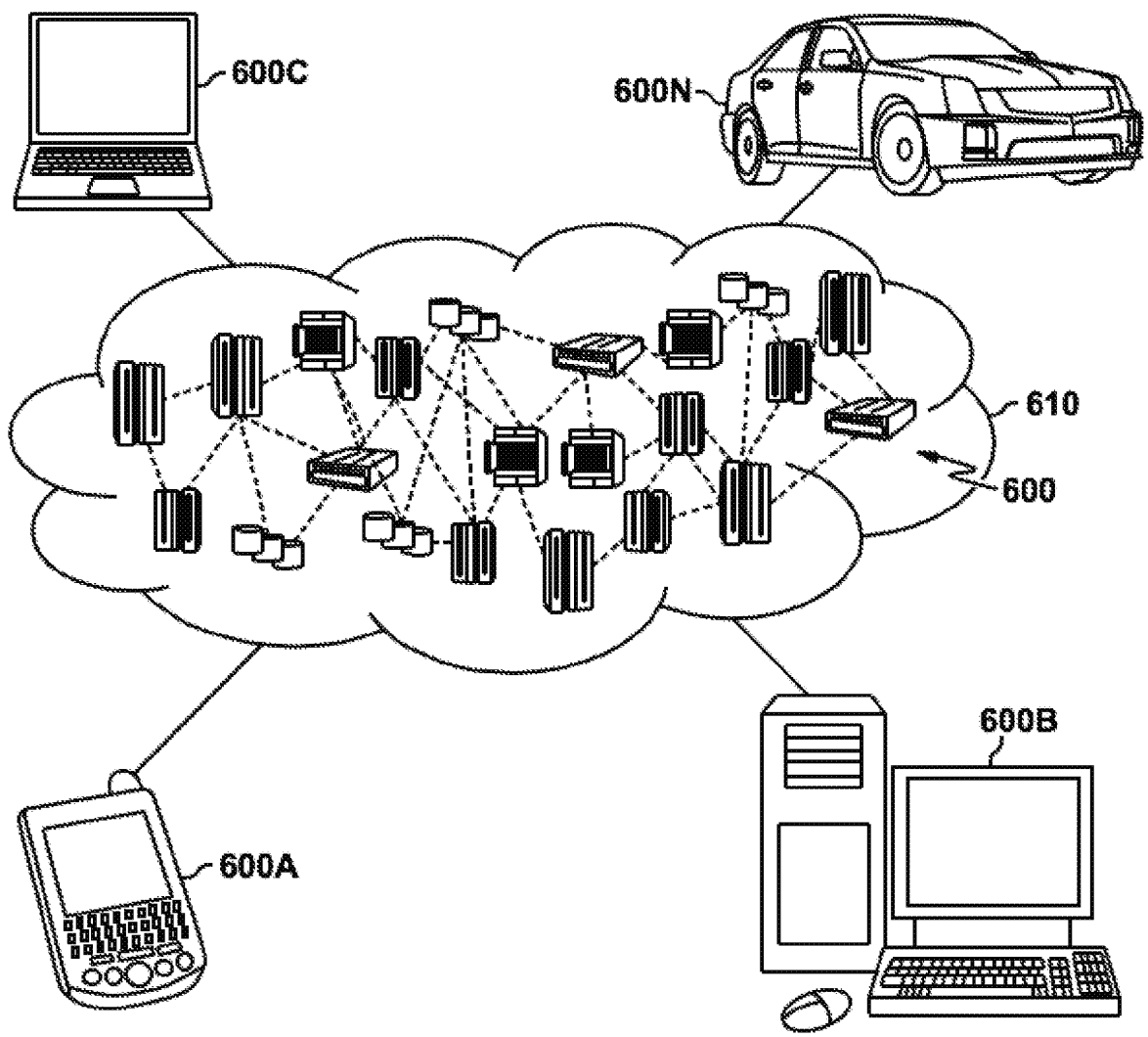
FIG. 6 depicts a cloud computing environment, in accordance with embodiments of the present disclosure.

Referring now to FIG. 6, illustrative cloud computing environment 610 is depicted. As shown, cloud computing environment 610 includes one or more cloud computing nodes 600 with which local computing devices used by cloud consumers, such as, for example, personal digital assistant (PDA) or cellular telephone 600A, desktop computer 600B, laptop computer 600C, and/or automobile computer system 600N may communicate. Nodes 600 may communicate with one another. They may be grouped (not shown) physically or virtually, in one or more networks, such as Private, Community, Public, or Hybrid clouds as described hereinabove, or a combination thereof.

This allows cloud computing environment 610 to offer infrastructure, platforms and/or software as services for which a cloud consumer does not need to maintain resources on a local computing device. It is understood that the types of computing devices 600A-N shown in FIG. 6 are intended to be illustrative only and that computing nodes 600 and cloud computing environment 610 can communicate with any type of computerized device over any type of network and/or network addressable connection (e.g., using a web browser).

Figure 7:
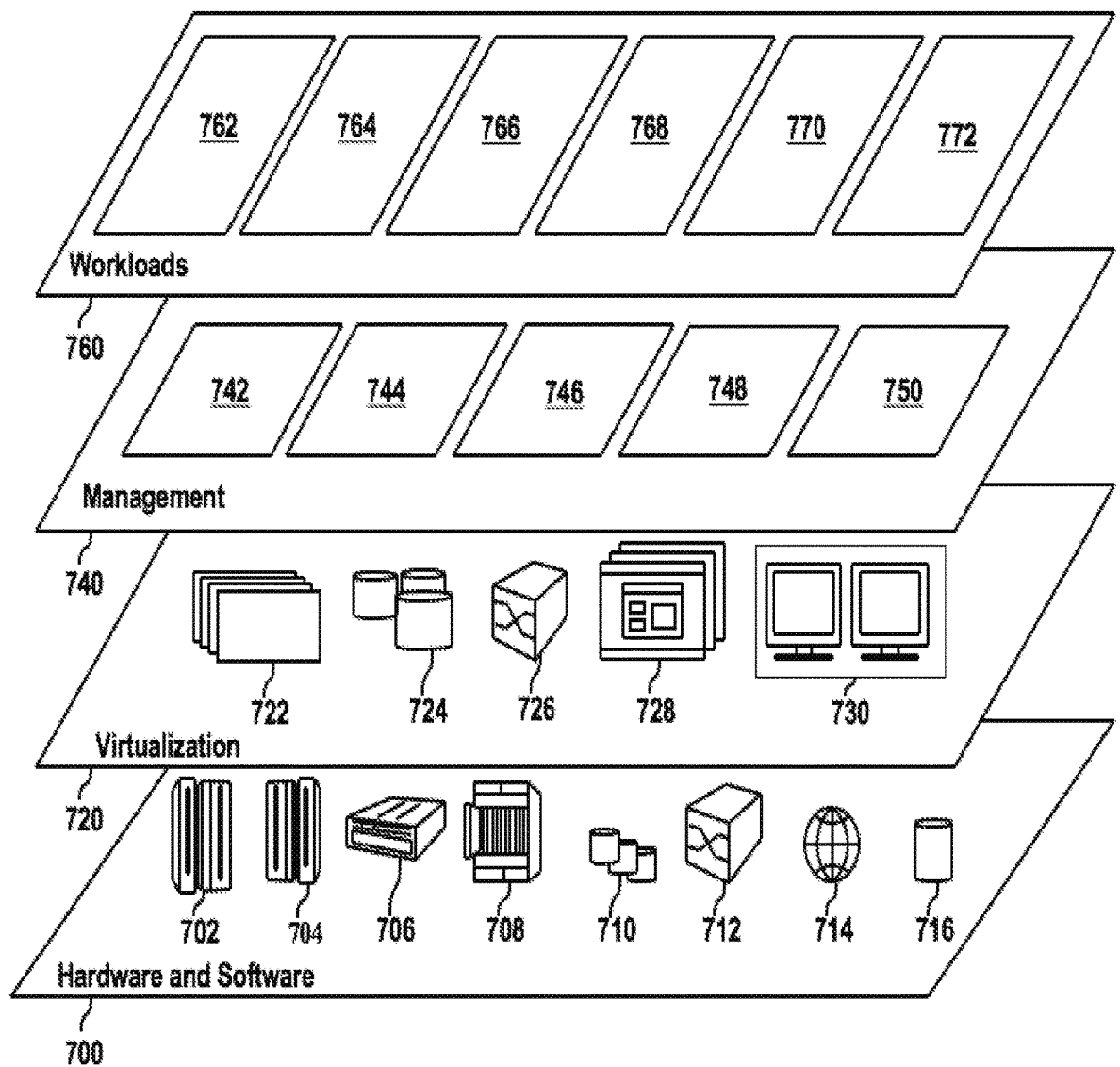
FIG. 7 depicts abstraction model layers, in accordance with embodiments of the present disclosure.

Referring now to FIG. 7, a set of functional abstraction layers provided by cloud computing environment 610 (FIG. 6) is shown. It should be understood in advance that the components, layers, and functions shown in FIG. 7 are intended to be illustrative only and embodiments of the invention are not limited thereto. As depicted below, the following layers and corresponding functions are provided.

Hardware and software layer 700 includes hardware and software components. Examples of hardware components include: mainframes 702; RISC (Reduced Instruction Set Computer) architecture based servers 704; servers 706; blade servers 708; storage devices 710; and networks and networking components 712. In some embodiments, software components include network application server software 714 and database software 716.

Virtualization layer 720 provides an abstraction layer from which the following examples of virtual entities may be provided: virtual servers 722; virtual storage 724; virtual networks 726, including virtual private networks; virtual applications and operating systems 728; and virtual clients 730.

In one example, management layer 740 may provide the functions described below. Resource provisioning 742 provides dynamic procurement of computing resources and other resources that are utilized to perform tasks within the cloud computing environment. Metering and Pricing 744 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 746 provides access to the cloud computing environment for consumers and system administrators. Service level management 748 provides cloud computing resource allocation and management such that required service levels are met. Service Level Agreement (SLA) planning and fulfillment 750 provide pre-arrangement for, and procurement of, cloud computing resources for which a future requirement is anticipated in accordance with an SLA.

Workloads layer 760 provides examples of functionality for which the cloud computing environment may be utilized. Examples of workloads and functions which may be provided from this layer include: mapping and navigation 762; software development and lifecycle management 764; virtual classroom education delivery 766; data analytics processing 768; transaction processing 770; and mobile desktop 772.

Figure 8:
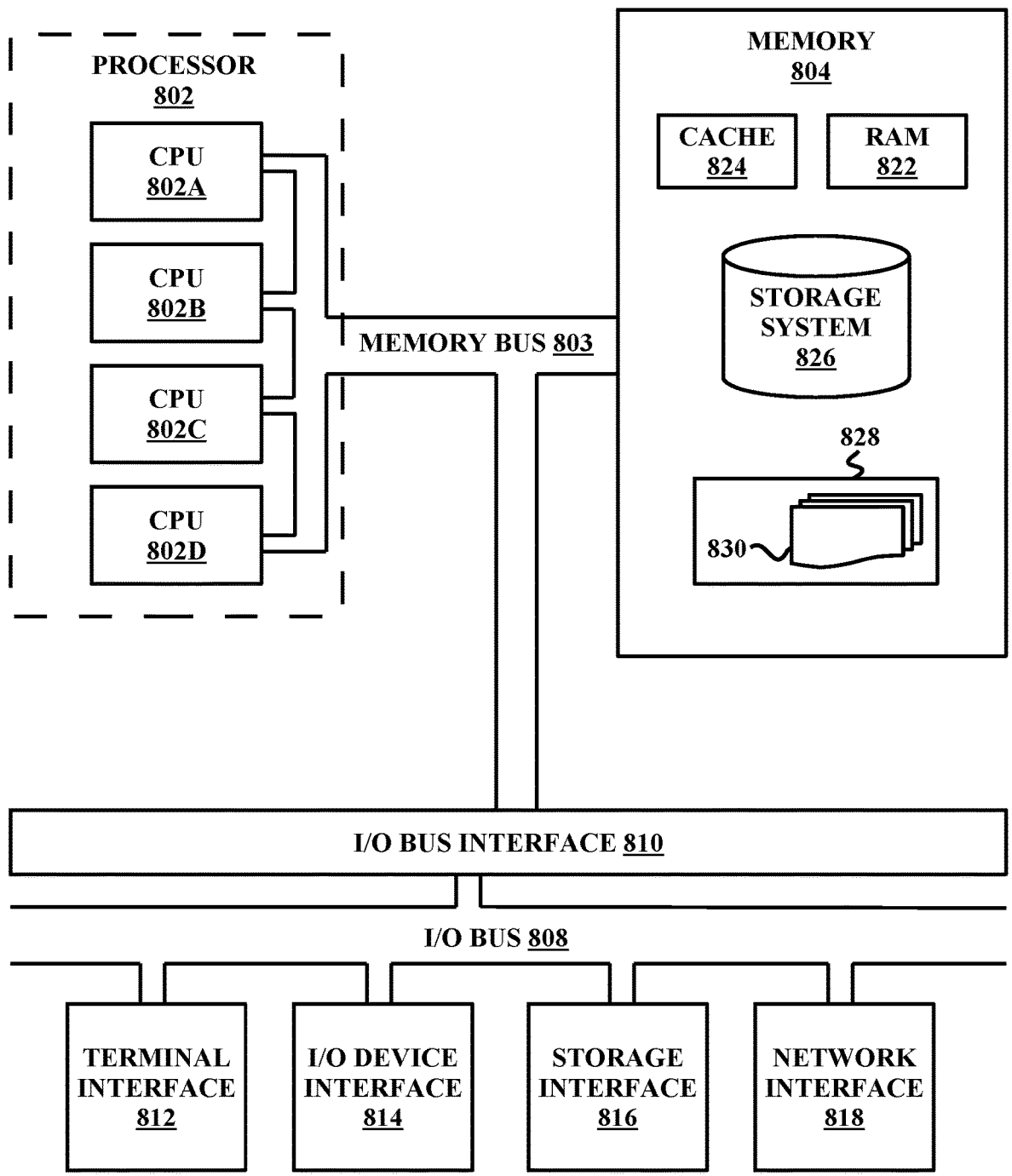
FIG. 8 illustrates a high-level block diagram of an example computer system that may be used in implementing one or more of the methods, tools, and modules, and any related functions, described herein, in accordance with embodiments of the present disclosure.

Referring now to FIG. 8, shown is a high-level block diagram of an example computer system 801 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 801 may comprise one or more CPUs 802, a memory subsystem 804, a terminal interface 812, a storage interface 816, an I/O (Input/Output) device interface 814, and a network interface 818, all of which may be communicatively coupled, directly or indirectly, for inter-component communication via a memory bus 803, an I/O bus 808, and an I/O bus interface unit 810.

The computer system 801 may contain one or more general-purpose programmable central processing units (CPUs) 802A, 802B, 802C, and 802D, herein generically referred to as the CPU 802. In some embodiments, the computer system 801 may contain multiple processors typical of a relatively large system; however, in other embodiments the computer system 801 may alternatively be a single CPU system. Each CPU 802 may execute instructions stored in the memory subsystem 804 and may include one or more levels of on-board cache.

System memory 804 may include computer system readable media in the form of volatile memory, such as random access memory (RAM) 822 or cache memory 824. Computer system 801 may further include other removable/non-removable, volatile/non-volatile computer system storage media. By way of example only, storage system 826 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 804 can include flash memory, e.g., a flash memory stick drive or a flash drive. Memory devices can be connected to memory bus 803 by one or more data media interfaces. The memory 804 may include at least one program product having a set (e.g., at least one) of program modules that are configured to carry out the functions of various embodiments.

One or more programs/utilities 828, each having at least one set of program modules 830 may be stored in memory 804. The programs/utilities 828 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 828 and/or program modules 830 generally perform the functions or methodologies of various embodiments.

Although the memory bus 803 is shown in FIG. 8 as a single bus structure providing a direct communication path among the CPUs 802, the memory subsystem 804, and the I/O bus interface 810, the memory bus 803 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 801 may be a multi-user mainframe computer system, a single-user system, or a server computer or similar device that has little or no direct user interface, but receives requests from other computer systems (clients). Further, in some embodiments, the computer system 801 may be implemented as a desktop computer, portable computer, laptop or notebook computer, tablet computer, pocket computer, telephone, smartphone, network switches or routers, or any other appropriate type of electronic device.

It is noted that FIG. 8 is intended to depict the representative major components of an exemplary computer system 801. In some embodiments, however, individual components may have greater or lesser complexity than as represented in FIG. 8, components other than or in addition to those shown in FIG. 8 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
receiving, by a query module, a query input for a particular subject within a specified recording;
identifying, by a natural language processing system, the particular subject in the query input;
identifying, by the natural language processing system, a plurality of sections within the specified recording, the plurality of sections including references to the particular subject in the query using lexical analysis by converting sequences of characters into a sequence of tokens to identify word boundaries in the specified recording and breaking text within the specified recording into component text elements;
identifying, by the natural language processing system, context sections of the specified recording, the context sections providing context to the references included in the identified plurality of sections;
grouping sections of the plurality of sections with respectively corresponding context sections to create sequential sets of recording subdivisions of the specified recording;
automatically identifying at least one subject disclosed in each recording subdivision;
determining, for each recording subdivision, a subject score according to the number of times the particular subject is an identified subject in each recording subdivision;
generating a new recording including only recording subdivisions having subject scores exceeding a subject identification threshold; and
presenting the new recording to the user.

2. The method of claim 1, further comprising:
determining that at least two sections of the plurality of sections include at least one common feature corresponding to the particular subject.

3. The method of claim 1, further comprising:
generating a plurality of partitions, wherein the plurality of partitions are generated by:
identifying a total number of the plurality of sections,
correlating the total number of the plurality of sections to a first partition, wherein the first partition includes all of the plurality of sections and is associated with a first granularity, and
correlating each subsequent partition of the plurality of partitions to one minus the previous number of the plurality of sections, wherein each subsequent partition is associated with a corresponding granularity.

4. The method of claim 3, further comprising:
determining which of the sequential sets of subdivisions to present to the user based on a selected granularity of the partitions; and
emphasizing one or more specific areas of the recording associated with the determined subdivisions to present to the user.

5. The method of claim 1, further comprising:
analyzing, using natural language processing, the plurality of sections; and
identifying a similar acoustic within at least two of the plurality of sections, wherein the similar acoustic is a sound identified to be above an identical acoustic threshold.

6. The method of claim 1, further comprising:
analyzing the recording for the particular subject; and
tagging, with an indicator, the plurality of sections in which the particular subject is identified.

7. The method of claim 1, further comprising:
accessing a subject repository, wherein the subject repository includes images and textual representations of dialogue of the recording; and
examining the subject repository for one or more images or textual representations of dialogue associated with the particular subject.

8. A system comprising:
a memory; and
a query module in communication with the memory, the query module being configured to perform operations comprising:
receiving, by a query module, a query input for a particular subject within a specified recording;
identifying, by a natural language processing system, the particular subject in the query input;
identifying, by the natural language processing system, a plurality of sections within the specified recording, the plurality of sections including references to the particular subject in the query using lexical analysis by converting sequences of characters into a sequence of tokens to identify word boundaries in the specified recording and breaking text within the specified recording into component text elements;

identifying, by the natural language processing system, context sections of the specified recording, the context sections providing context to the references included in the identified plurality of sections;

grouping sections of the plurality of sections with respectively corresponding context sections to create sequential sets of recording subdivisions of the specified recording;

automatically identifying at least one subject disclosed in each recording subdivision;

determining, for each recording subdivision, a subject score according to the number of times the particular subject is an identified subject in each recording subdivision;

generating a new recording including only recording subdivisions having subject scores exceeding a subject identification threshold; and presenting the new recording to the user.

9. The system of claim 8, further comprising:
determining that at least two sections of the plurality of sections include at least one common feature corresponding to the particular subject.

10. The system of claim 8, further comprising:
analyzing, using natural language processing, the plurality of sections; and
identifying a similar acoustic within at least two of the plurality of sections, wherein the similar acoustic is a sound identified to be above an identical acoustic threshold.

11. The system of claim 8, further comprising:
analyzing the recording for the particular subject; and
tagging, with an indicator, the plurality of sections in which the particular subject is identified.

12. The system of claim 8, further comprising:
accessing a subject repository, wherein the subject repository includes images and textual representations of dialogue of the recording; and
examining the subject repository for one or more images or textual representations of dialogue associated with the particular subject.

13. A computer program product comprising a computer readable storage medium having program instructions embodied therewith, the program instructions executable by a query module to cause the query module to perform a method, the method comprising:
receiving, by a query module, a query input for a particular subject within a specified recording;
identifying, by a natural language processing system, the particular subject in the query input;
identifying, by the natural language processing system, a plurality of sections within the specified recording, the plurality of sections including references to the particular subject in the query using lexical analysis by converting sequences of characters into a sequence of tokens to identify word boundaries in the specified recording and breaking text within the specified recording into component text elements;

identifying, by the natural language processing system, context sections of the specified recording, the context sections providing context to the references included in the identified plurality of sections;

grouping sections of the plurality of sections with respectively corresponding context sections to create sequential sets of recording subdivisions of the specified recording;

automatically identifying at least one subject disclosed in each recording subdivision;

determining, for each recording subdivision, a subject score according to the number of times the particular subject is an identified subject in each recording subdivision;

generating a new recording including only recording subdivisions having subject scores exceeding a subject identification threshold; and presenting the new recording to the user.

14. The computer program product of claim 13, further comprising:
determining that at least two sections of the plurality of sections include at least one common feature corresponding to the particular subject.

15. The computer program product of claim 14, further comprising:
generating a plurality of partitions, wherein the plurality of partitions are generated by:
identifying a total number of the plurality of sections,
correlating the total number of the plurality of sections to a first partition, wherein the first partition includes all of the plurality of sections and is associated with a first granularity, and
correlating each subsequent partition of the plurality of partitions to one minus the previous number of the plurality of sections, wherein each subsequent partition is associated with a corresponding granularity.

16. The method of claim 1, wherein identifying corresponding sections of the recording providing the context to the identified references is performed using an image processing system.

17. The method of claim 1, wherein presenting the sequential sets of subdivisions to the user includes:
combining the sequential sets of subdivisions into a single recording in chronological order.

* * * * *